(12) United States Patent
Brooke et al.

(10) Patent No.: US 7,861,459 B2
(45) Date of Patent: Jan. 4, 2011

(54) HYDROPONIC PLANT NUTRIENT CIRCULATION/DISTRIBUTION SYSTEM

(75) Inventors: Lawrence L. Brooke, Sebastopol, CA (US); Henry Rie, Richmond, CA (US)

(73) Assignee: General Hydroponics, Inc., Sebastopol, CA (US)

( * ) Notice: Subject to any disclaimer, the term of this patent is extended or adjusted under 35 U.S.C. 154(b) by 903 days.

(21) Appl. No.: 11/725,687

(22) Filed: Mar. 19, 2007

(65) Prior Publication Data
US 2008/0229661 A1    Sep. 25, 2008

(51) Int. Cl.
*A01G 29/00* (2006.01)
*A01G 25/00* (2006.01)
(52) U.S. Cl. ............................................ 47/48.5; 47/79
(58) Field of Classification Search ............... 47/48.5, 47/79; 285/123.3, 133.11, 133.21, 133.3, 285/133.4, 133.5, 133.6; 138/115
See application file for complete search history.

(56) References Cited

U.S. PATENT DOCUMENTS

| 950,512 | A | * | 3/1910 | Nicolls et al. | ............ | 285/123.3 |
| 1,930,285 | A | * | 10/1933 | Robinson | ..................... | 138/143 |
| 2,567,639 | A | * | 9/1951 | Fulton | ......................... | 285/22 |
| 3,455,336 | A | * | 7/1969 | Ellis | ........................... | 138/156 |
| 5,273,066 | A | * | 12/1993 | Graham et al. | ............. | 137/78.3 |
| 5,971,667 | A | * | 10/1999 | Graham | ...................... | 405/184 |
| 7,069,691 | B2 | * | 7/2006 | Brooke et al. | ............... | 47/59 R |

* cited by examiner

*Primary Examiner*—Timothy D Collins
*Assistant Examiner*—Monica Williams
(74) *Attorney, Agent, or Firm*—Michael Blaine Brooks, P.C.; Michael B. Brooks

(57) ABSTRACT

A hydroponic liquid nutrient circulation system which includes a plurality of liquid reservoirs, each with a sidewall opening that receives the shank of a split tee device that has separate liquid inlet and outlet passages for flow of liquids into, and out of, the internal space of the reservoirs. The system may include a controller reservoir connected to one or more of these liquid reservoirs.

5 Claims, 11 Drawing Sheets

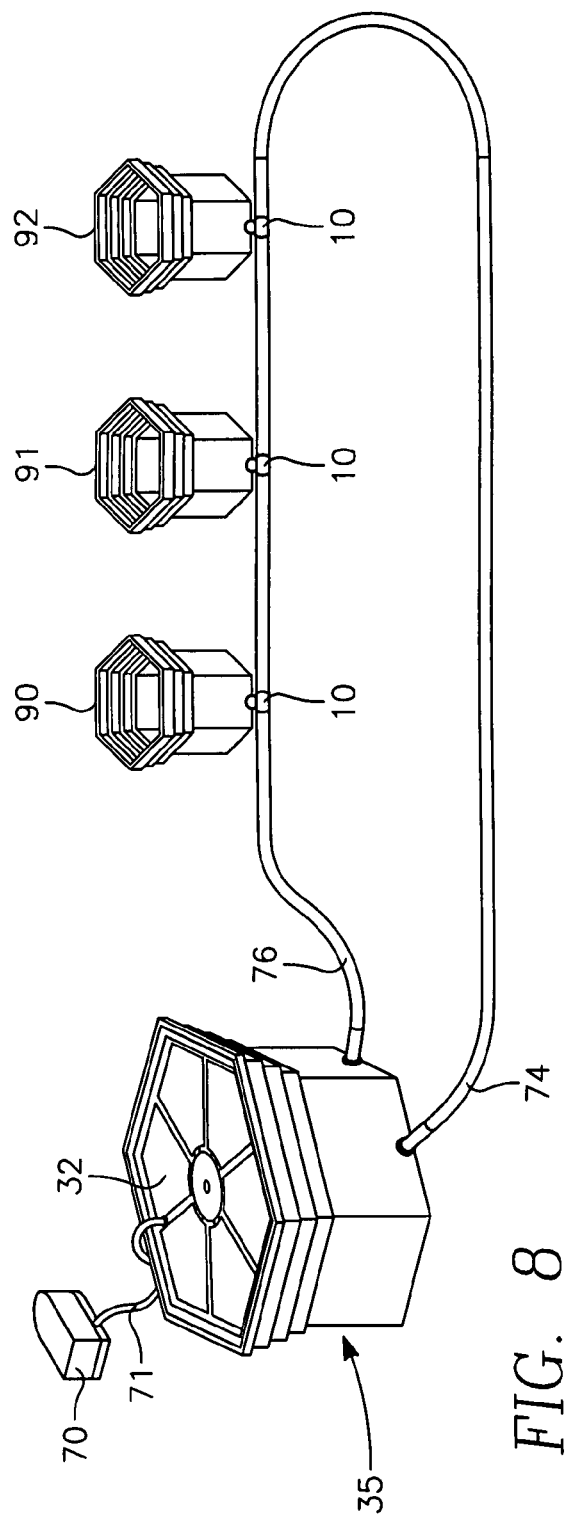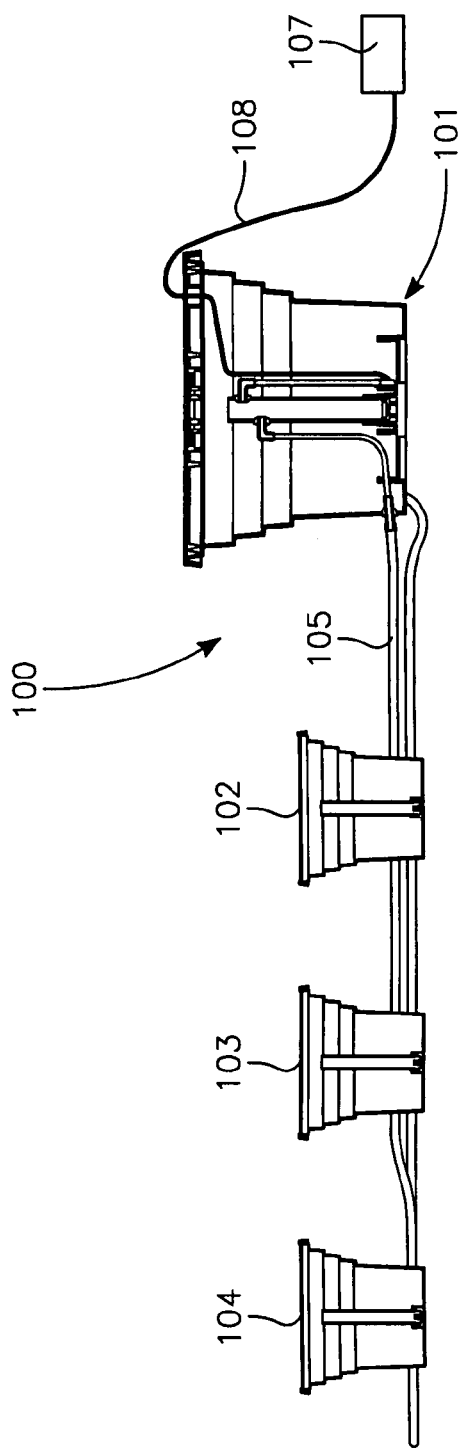

HYDROPONIC PLANT NUTRIENT CIRCULATION/DISTRIBUTION SYSTEM

BACKGROUND OF THE INVENTION

1. Field of the Invention

This invention relates to apparatus and methods for distributing/circulating liquid nutrients, preferably including water and one or more plant nutrients from one hydroponic reservoir to another. These reservoirs include sidewalls with at least one opening through which the shank of a hollow, split tee device is inserted. Liquid nutrients pass into and out from the reservoirs through tubing connected to the inlet and outlet ends of the crossbar of the split tee device.

2. Description of Related Art

Hydroponic plant growing systems are widely used today. Among the disclosures of such systems are: U.S. patent application Ser. No. 11/141,799, filed May 31, 2005, and entitled "Pneumatic Liquid Dispensing Assembly for Hydroponically Cultivated Plants"; and U.S. patent application Ser. No. 11/246,417, filed Oct. 7, 2005, and entitled "Modular Pipe Support System".

BRIEF SUMMARY OF THE INVENTION

This invention relates to apparatus and methods for distributing/circulating liquid nutrients, preferably including water and one or more plant nutrients, from one hydroponic reservoir to another. These reservoirs include sidewalls with at least one opening through which the shank of a hollow, split tee device is inserted. Liquid nutrients pass into and out from the reservoirs through tubing connected to the inlet and outlet ends of the crossbar of the split tee device.

The shank of a split tee device has a generally cylindrical shape, and includes an internal divider that separates the inlet side of the tee device from the outlet side. The shank of the tee device includes two internal passages. One of these passages is generally cylindrical in shape, and communicates only with either the inlet or the outlet side of the device. The other internal passage is crescent-shaped, lies alongside the internal, cylindrical passage, and communicates only with the outlet side of the device, if the other passage communicates with the inlet side of the device, or only with the inlet side of the device, if the other passage communicates with the outlet side. The cylindrical passage is longer than the crescent-shaped passage, and extends beyond the end of the shank, but preferably has an outlet opening that has substantially the same cross-sectional area as the outlet opening of the crescent-shaped passage.

Inside the reservoir, particularly where the reservoir serves as a controller reservoir in a hydroponic liquid circulation system that includes one or more non-controller reservoirs connected in series to the controller reservoir, in at least some embodiments, is a vertically disposed center column, preferably cylindrical in shape, that includes an inlet opening near the top of the center column, connected to tubing for delivery of liquid nutrients inside the center column. The center column also includes an outlet opening, located vertically below the inlet opening, through which liquid nutrients pass out of the center column, and then, through tubing, and sealed fittings, through the side wall of the reservoir for delivery to another reservoir, or some other destination.

In some embodiments, the center column has a diameter in the range of about 2.0 inches to about 2.5 inches, and includes an end cap that closes the distal end of the center column on one side. The center column is held in place by a collar that fits frictionally over the bottom of the center column and a projection from the bottom of the reservoir that is complementary in size and shape to the center column. Air is delivered from an air pump, through narrow diameter tubing and an opening in the reservoir closure, and then through a connector fitting, to pump liquids, e.g., liquid nutrients, up into a larger diameter riser tube. The connector fitting includes an arm which is integrally formed with the connector, and is disposed at an acute angle with respect to the vertical axis of the connector. The bottom open end of the connector is formed at an angle to prevent an inadvertent seal between the bottom of the connector and the bottom of the reservoir. The riser tube fits onto an input fitting, which is sealed between the fitting and the center column. The air from an air pump pushes liquids, e.g., liquid nutrients, through the fittings and tubings into the riser tube. Once the nutrients are in the riser tube, air pressure continues to push the liquid nutrients up the riser tube and through the inlet fitting between the riser tube and center column filling the center column with nutrients. Once the center column is filled, the nutrients pass out of the center column through an output fitting which is located below the input fitting and is sealed between the output fitting and the center column with a removable, insertable grommet. An output hose is connected to an output fitting, and at the other end is connected to a barbed fitting. The barbed fitting passes through a passage in the side wall of the reservoir. A grommet provides a seal between the barbed fitting and the side wall of the reservoir. In some embodiments, the narrow diameter tube has a diameter in the range of about 0.15 inches to about 0.25 inches; the larger diameter tube has a diameter in the range of about 0.35 inches to about 0.50 inches.

Surrounding the openings in the sidewall of the reservoir, and in the center column, are removable, replaceable grommets that sealingly engage tubes and tubing that pass through such openings and grommets.

Hydroponic reservoir systems may include at least one controller-reservoir, and at least one other non-controller reservoir that includes the split tee device described above inserted through the sidewall of the non-controller reservoir. In some embodiments, the controller reservoir may also include the split tee device. The non-controller reservoirs may then be connected to the controller reservoir by a line through which liquid nutrients pass from the controller reservoir to the non-controller reservoirs, and back to said controller reservoir.

The non-controller reservoirs may include an internal, upright tube with its outlet connected to the split tee device through its cylindrical shaped passage. Preferably, each non-controller reservoir lies in substantially the same plane as, or in a lower plane than, the controller reservoir, and the top of the internal, upright tube in the non-controller reservoir from which liquids return directly to the controller reservoir lies substantially at or above the liquid level in the controller reservoir.

BRIEF DESCRIPTION OF THE DRAWINGS

This invention can better be understood by reference to the drawings, provided for exemplary purposes, and in which:

FIG. 8 shows a system with the reservoir of FIG. 5 feeding numerous devices of FIG. 7 in a closed loop system.

FIG. 9 shows a side elevation view of a system with the controller reservoir of FIG. 13 and a plurality of the non-controller reservoirs shown in FIGS. 11 and 12.

DETAILED DESCRIPTION OF THE INVENTION

Figure 1:
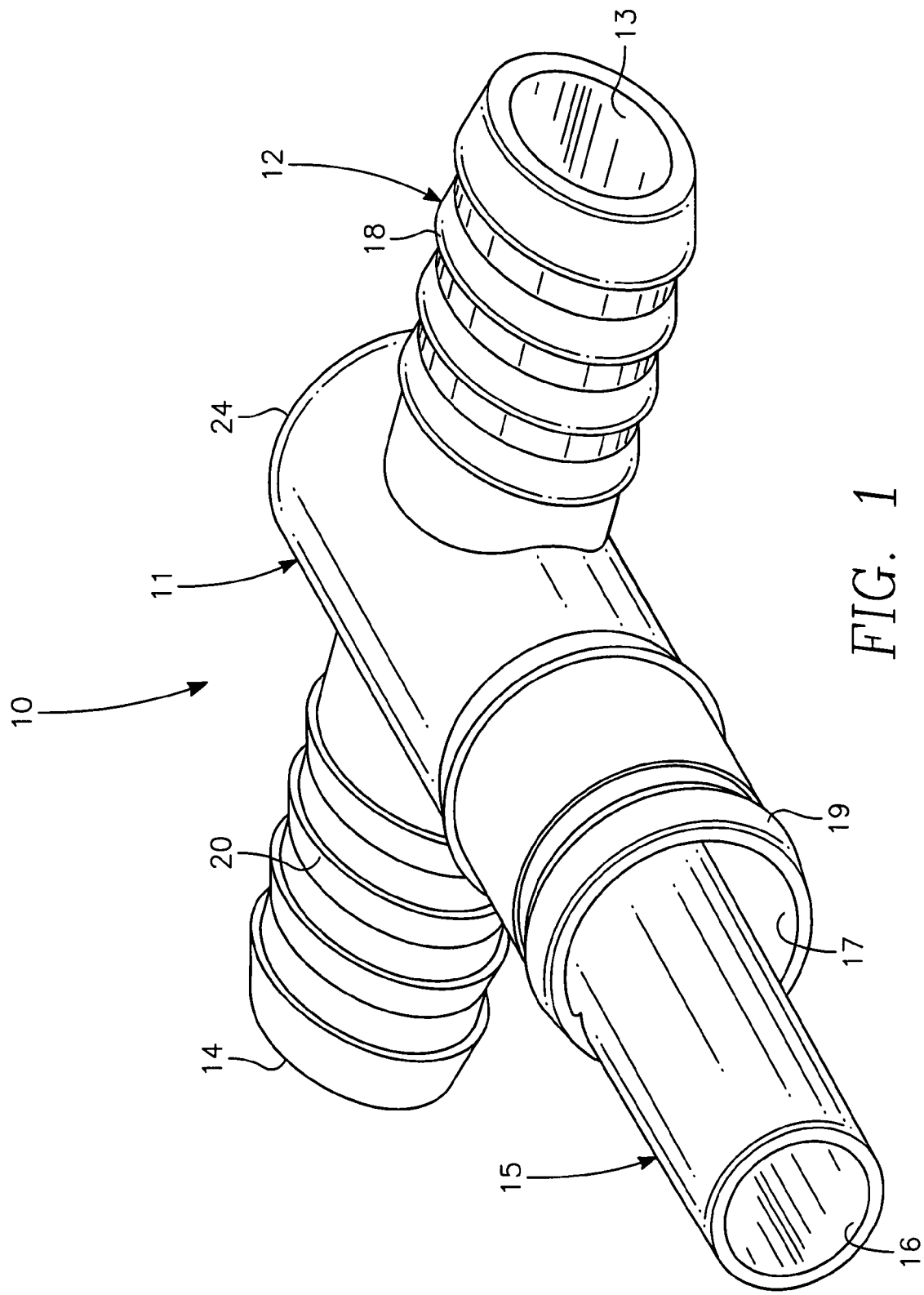
FIG. 1 shows an isometric view of an embodiment of a split tee device.
Figure 2:
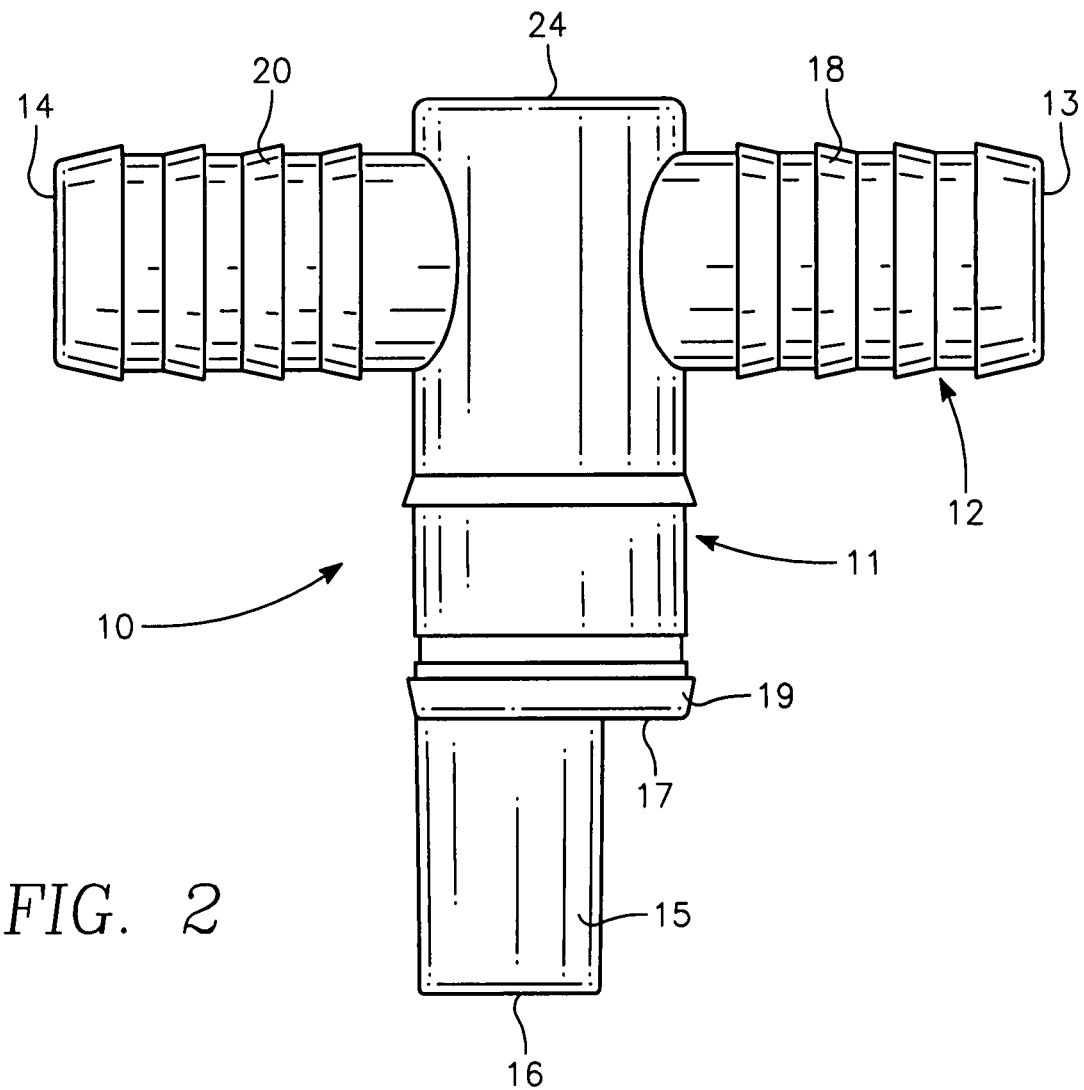
FIG. 2 shows a top plan view of the device shown in FIG. 1.
Figure 3:
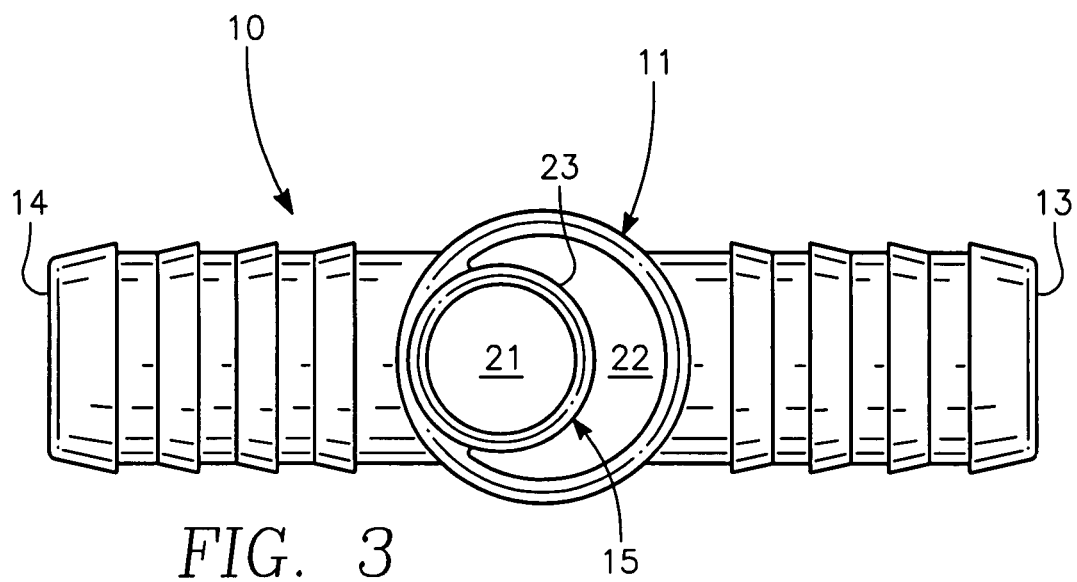
FIG. 3 shows a front view of the device shown in FIGS. 1 and 2.
Figure 4:
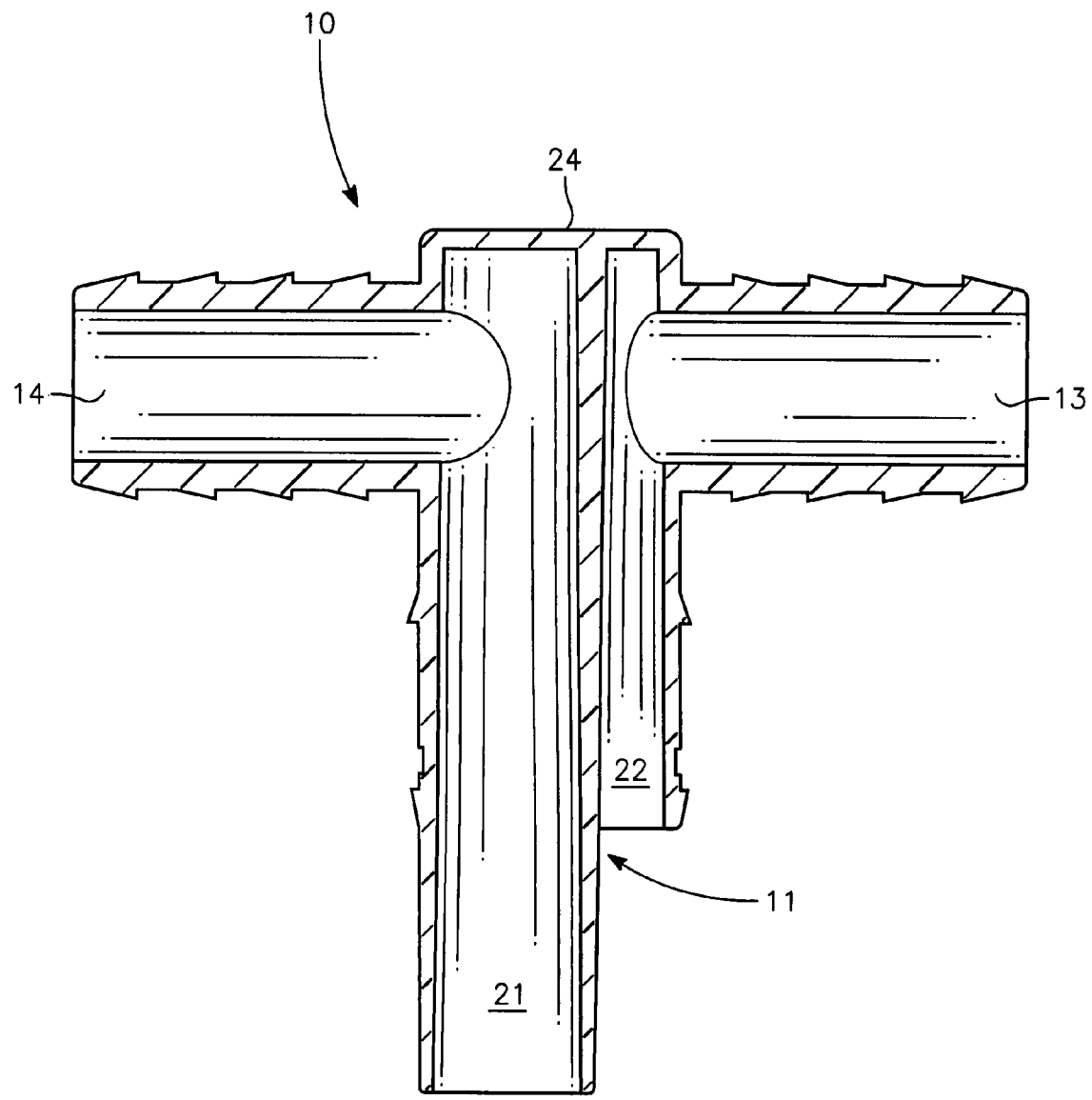
FIG. 4 shows a top cross-sectional view of the device shown in FIGS. 1, 2, and 3.

FIGS. 1 to 4 show the split tee device 10, including shank 11, and crossbar 18/20. Shank 11 and crossbars 18/20 are generally cylindrical in shape, and are hollow to permit liquid nutrients to pass through. Inside the shank 11 are internal passage 16, cylindrical in shape, and crescent-shaped passage 17. Passage 17 communicates with crossbar section 18, but not with crossbar section 20. Passage 16 communicates with crossbar section 20, but not with crossbar section 18. Liquid nutrients flow through opening 13, crossbar section 18, shank opening 17, and passage 22. Liquid nutrients also flow through opening 14, crossbar section 20, opening 16, and passage 21. External, circumferential rib 19 provides frictional engagement with grommets, tubes or tubing fitted onto shank 11. Closure 24 prevents liquids from escaping the inside of split tee 10 from the crossbar region.

Figure 5:
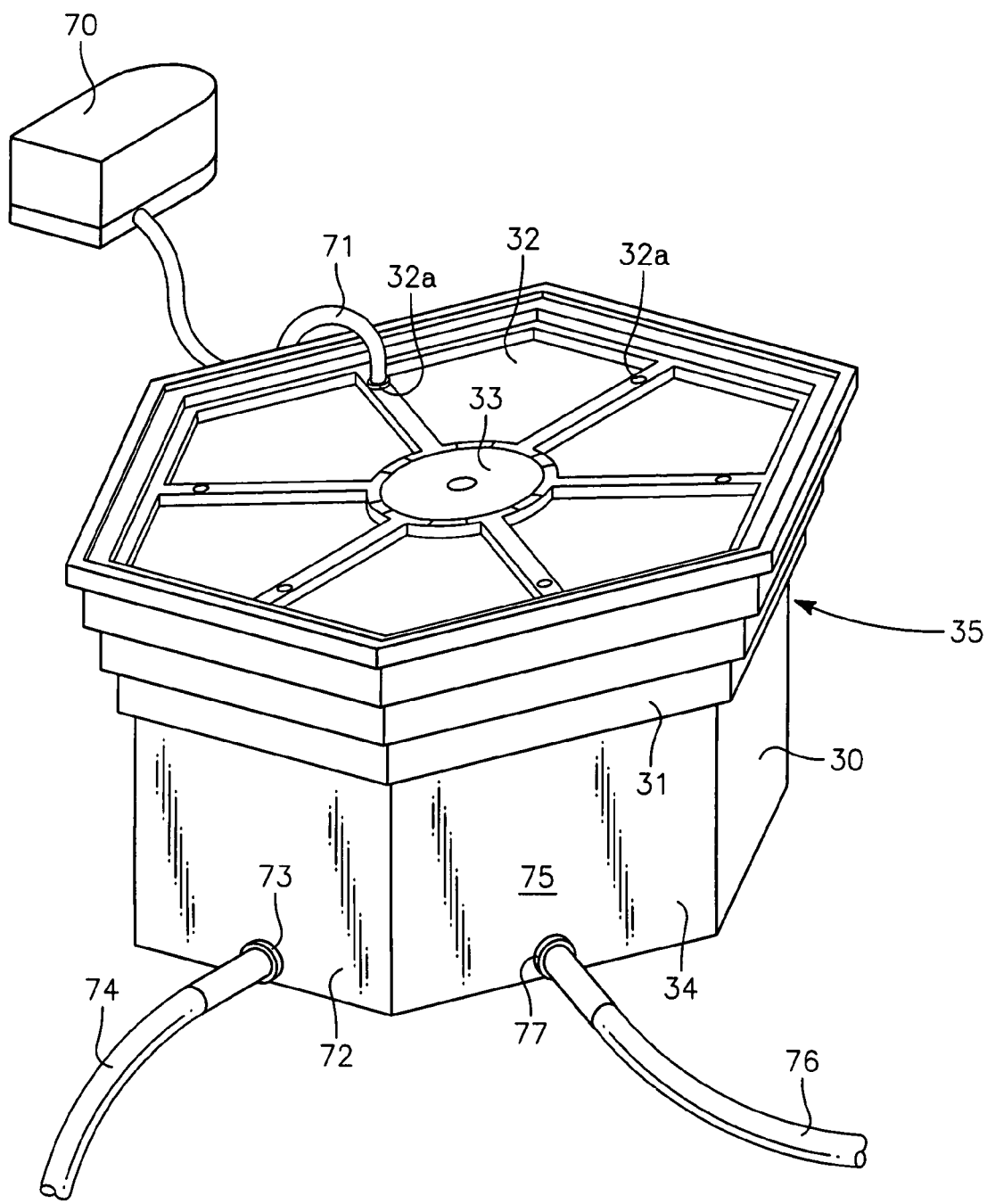
FIG. 5 shows a perspective view of a reservoir which is used as the controller for a nutrient circulation/distribution system, including an input and output line to the reservoir and an air pump.

FIG. 5 shows reservoir 35, including six sidewalls 30, 34, each with stepped lateral sections 31. Reservoir closure 32 includes plug 33, and a multi-ribbed upper surface 31. Inserted through an opening in sidewall 72 is an input hose 74 which passes through removable grommet 73. Inserted through an adjacent side wall 75 opening is an output hose 76 which also passes through a removable grommet 77. Grommets 73 and 77 seal both the output and input hoses in their respective openings. An air pump 70 is also shown with a hose 71 which feeds thru an opening 32a in the reservoir closure.

Figure 6:
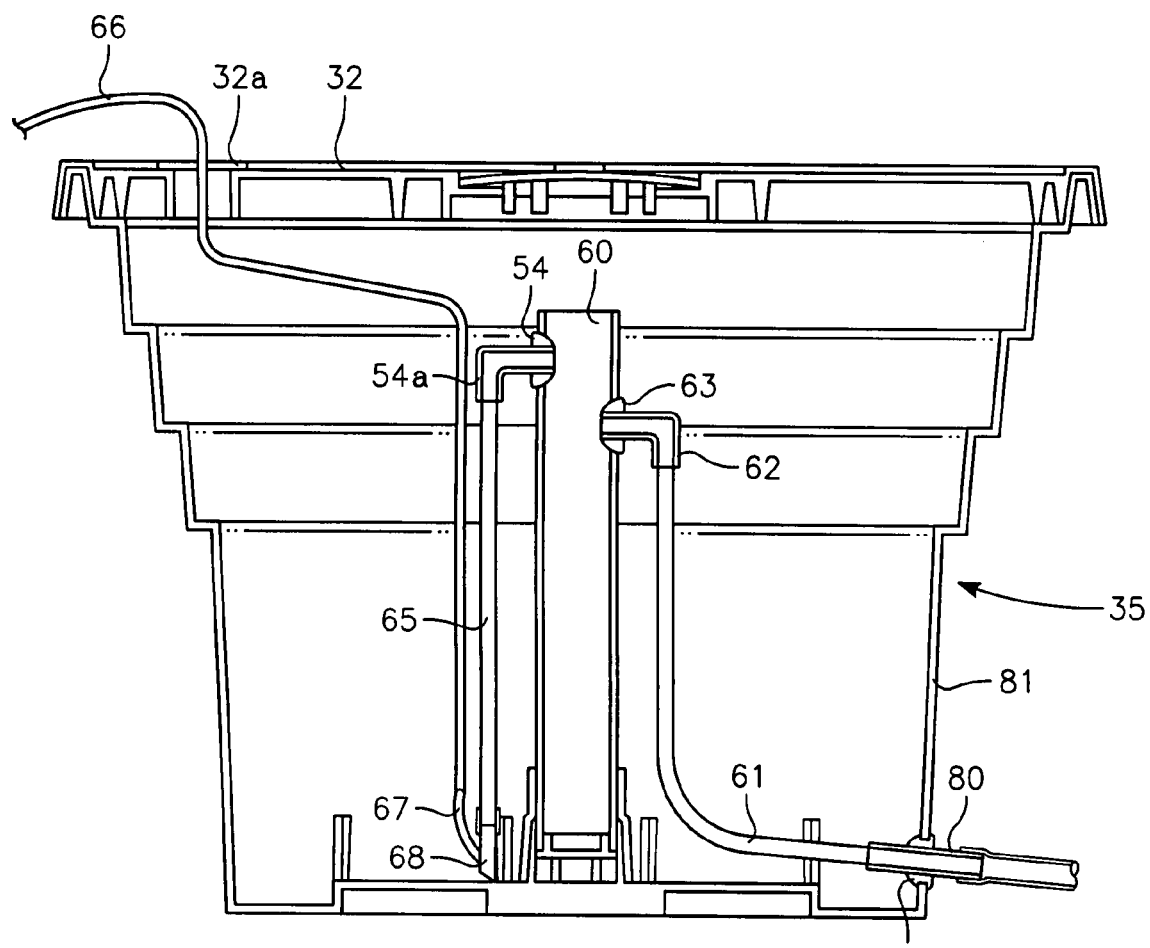
FIG. 6 shows a side elevation view of a reservoir which is used as a controller, in cross-section, with an inlet air line, riser tube, center column and outlet line.

FIG. 6 shows reservoir 35 with center column 60 vertically disposed near the center of the internal space inside reservoir 35. Liquids are added to the space inside reservoir 35 until the liquid level is somewhere below the top of center column 60. Air is delivered from an air pump, through narrow diameter tubing 66, which passes through an opening 32a in reservoir closure 32, through an arm 67 of a connector fitting 68, through a connector fitting 68 and up into a larger diameter riser tube 65. The arm 67 is integrally formed with connector 68, and is disposed at an acute angle with respect to the vertical axis of connector 68. The bottom open end of the connector 68 is formed at an angle to prevent an inadvertent seal between the bottom of the connector 68 and the bottom of the reservoir 35. Riser tube 65 fits onto input fitting 54a which is sealed between the fitting 54a and the center column 60 with a removable, insertable grommet 54. The air from the air pump pushes liquids, e.g., liquid nutrients, through the fittings and tubings into riser tube 65. Once the nutrients are in the riser tube, air pressure continues to push the liquid nutrients up the tube and through the inlet fitting between the riser tube and the center column filling the center column with nutrients. Once the center column is filled, the nutrients pass out of the center column through an output fitting 62 which is positioned below input fitting 54a and is sealed between the output fitting 62 and center column 60 with a removable, insertable grommet 63. Output hose 61 is connected to output fitting 62 and at the other end is connected to a barbed fitting 80. Barbed fitting 80 passed thru a passage in the side wall 81 of reservoir 35. Grommet 82 provides a seal between barbed fitting 80 and side wall 81 of reservoir 35.

Figure 7:
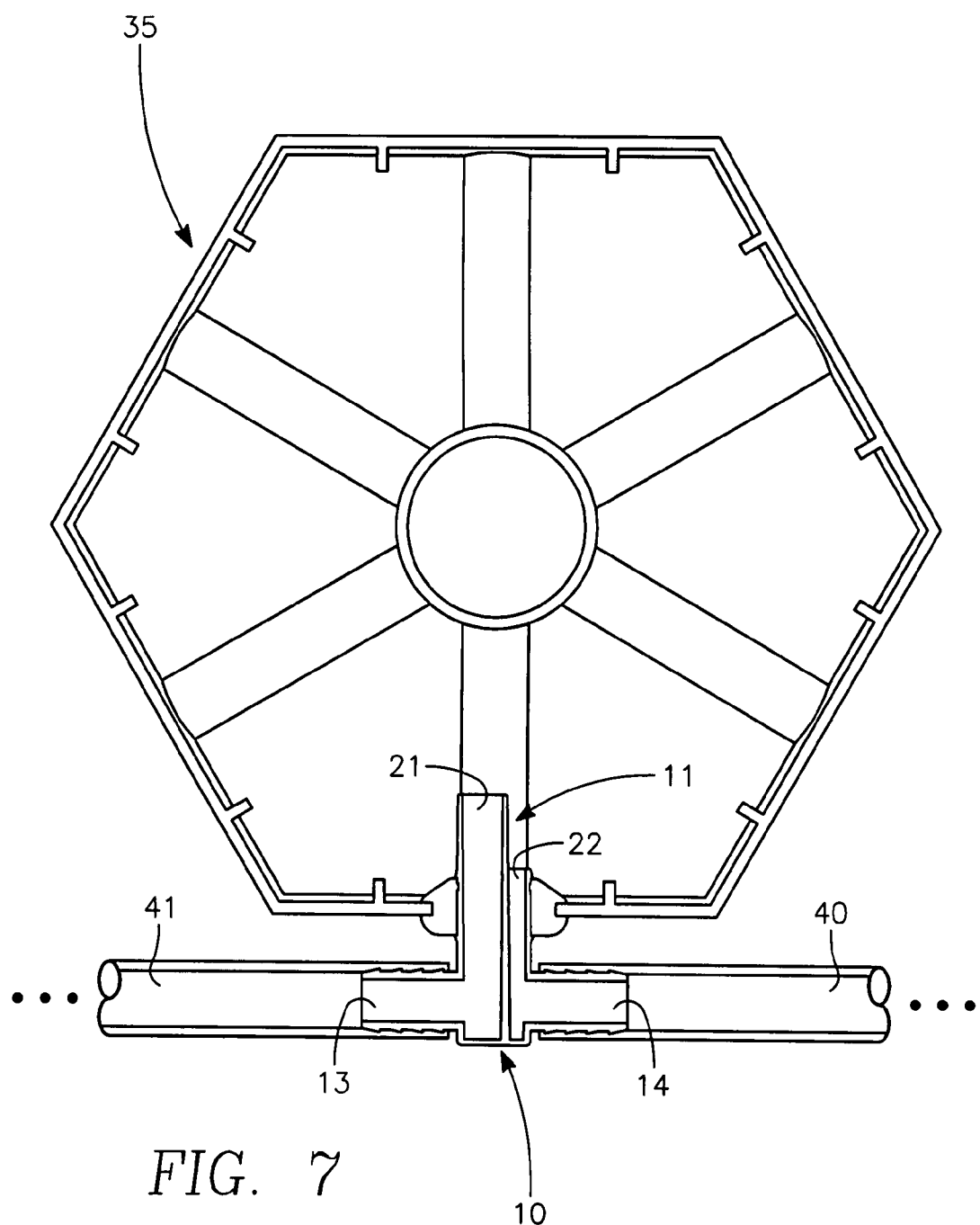
FIG. 7 shows a top plan view of a non-controller reservoir with the device of FIGS. 1 to 4 inserted through an opening in the sidewall of the reservoir, and includes a cross-sectional view through this split tee device.

FIG. 7 shows that, where reservoir 35 has no internal riser, passage 21 in the device 10 is the inlet for fluids into reservoir 35, and passage 22 in the device 10 is the outlet for fluids leaving reservoir 35. Thus, the split tee device 10 can use passage 21 as either the inlet or the outlet for liquids passing into or out of the internal space of the reservoir 35.

FIG. 8 shows reservoir 35 feeding three reservoirs 90, 91 and 92 of the kind shown in FIG. 7, connected to one another in a closed loop system. These three reservoirs may rest on the same plane as the controller reservoir 35, or on a different plane, higher or lower than the plane where reservoir 35 rests. Each of reservoirs 90, 91 and 92 includes the tee device 10. In this system, the liquid level in each reservoir lies in substantially the same plane.

Figure 10:
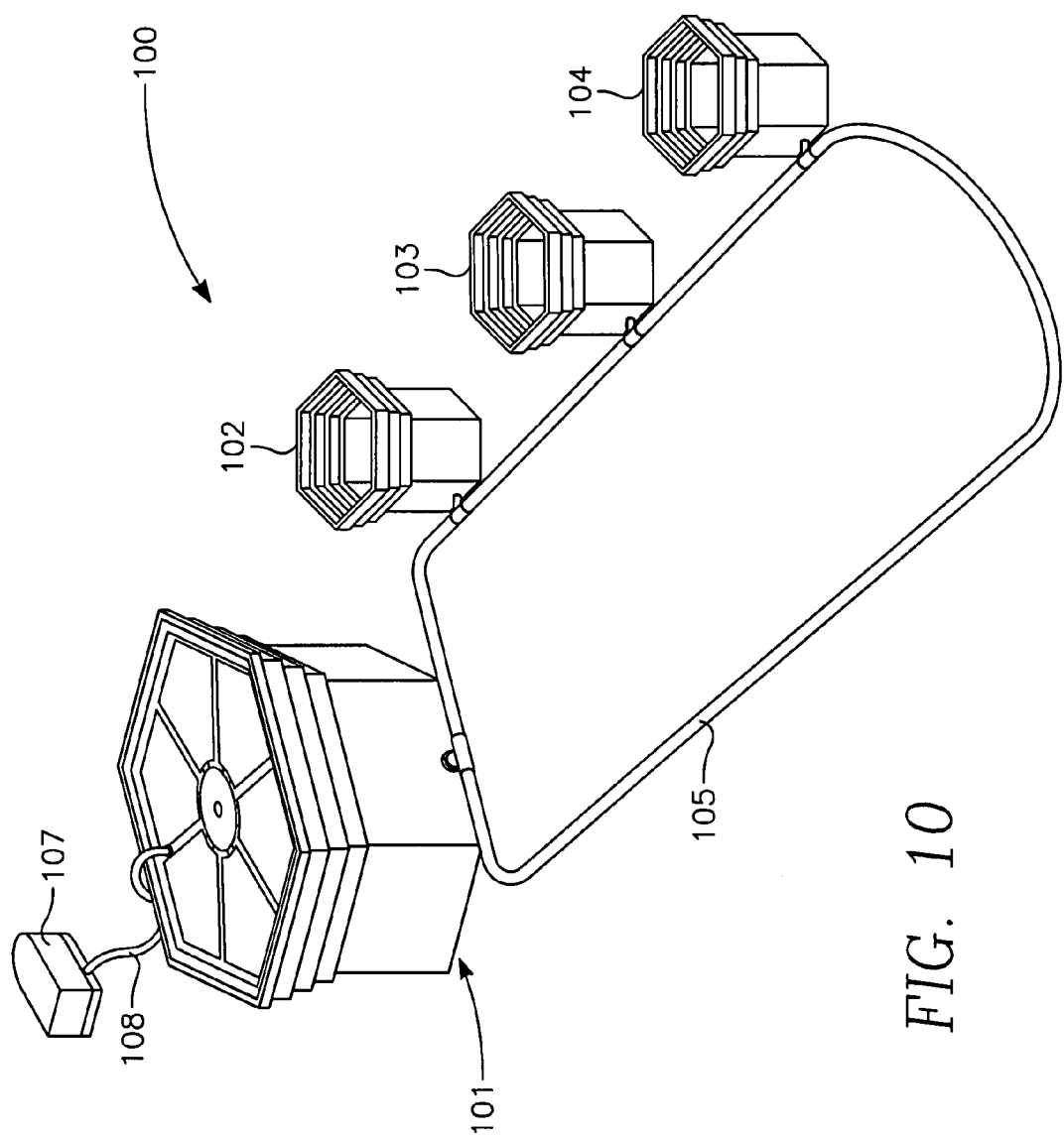
FIG. 10 shows a perspective view of the system shown in FIG. 9.

FIGS. 9 and 10 show side elevation and perspective views of a hydroponic system 100 including controller reservoir 101 and non-controller reservoirs 102, 103, and 104 connected to one another by line 105. Line 105 is connected to each reservoir 101, 102, 103, and 104 by split tee devices as shown in FIGS. 1 to 4. Each non-controller reservoir includes an internal, upright tube with its outlet connected to the split tee device through its cylindrical shaped passage. Air is pumped into reservoir 101 through 108 by pump 107, and the pressure of the air pumps liquid nutrients from controller reservoir 101 to reservoir 102. As the nutrients are pumped into reservoir 102 through the crescent shaped passage of the split tee, the nutrient level rises until the level reaches a height equal to the top of the upright tube. The nutrients then spill over into the upright tube and exit the reservoir through the cylindrical shaped passage of the split tee. The nutrients then travel through line 105 to the inlet side of the split tee in reservoir 103. The process of filling and overflowing continues from reservoir 103 to reservoir 104 and back to reservoir 101. Each of reservoirs 102, 103 and 104 may lie on substantially the same plane as reservoir 101, or on successfully lower planes, provided that the opening at the top of upright tube in reservoir 104 lies in substantially the same plane, or on a higher plane, than the liquid level in reservoir 101. In this system configuration, the nutrient level of each non-controller reservoir is maintained at substantially the same height as long as the vertical position of each subsequent non-controller reservoir is equal to or slightly below the vertical position of the reservoir immediately preceding it.

Figure 11:
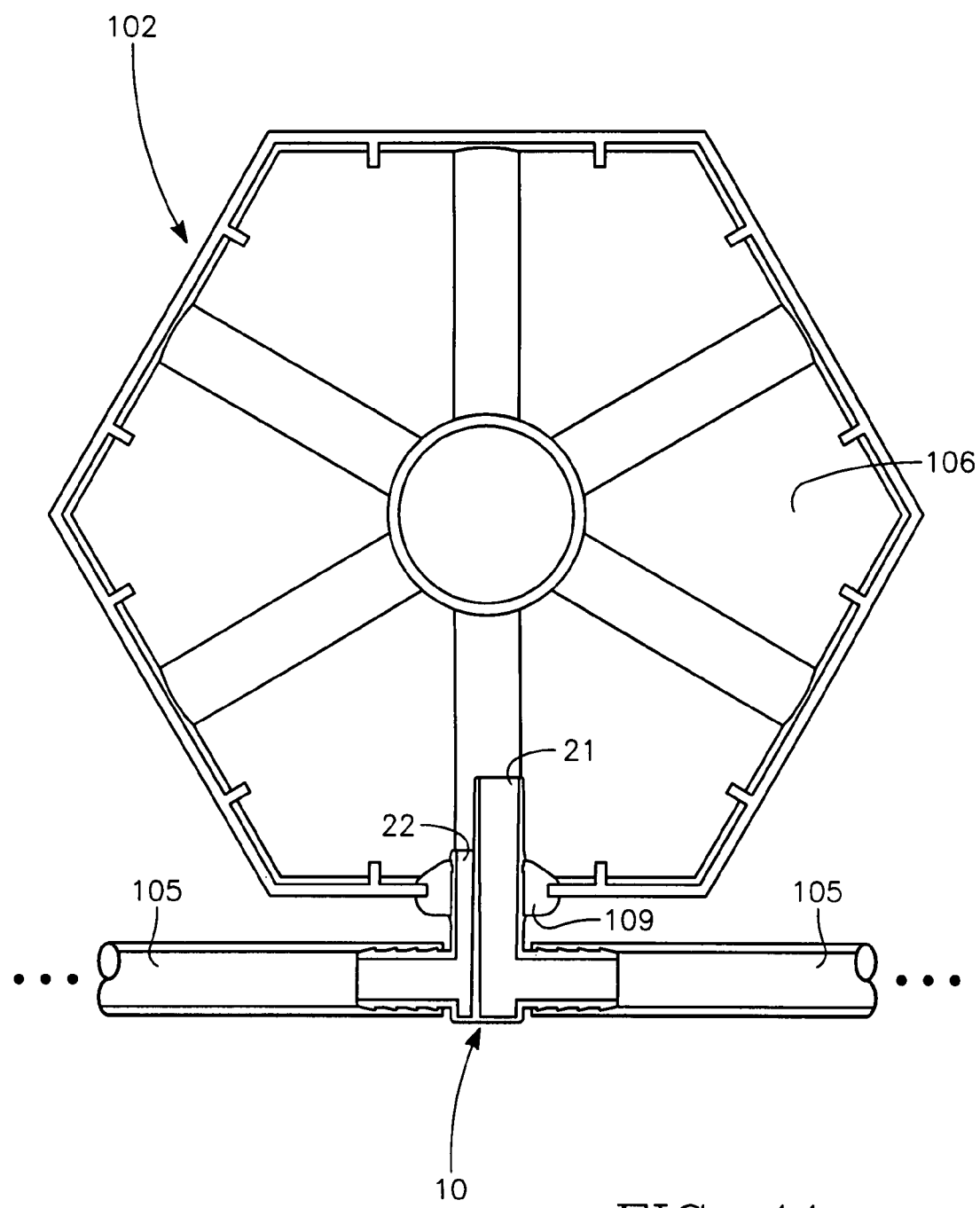
FIG. 11 shows a plan view in cross section of the non-controller reservoirs shown in FIGS. 9 and 10.
Figure 12:
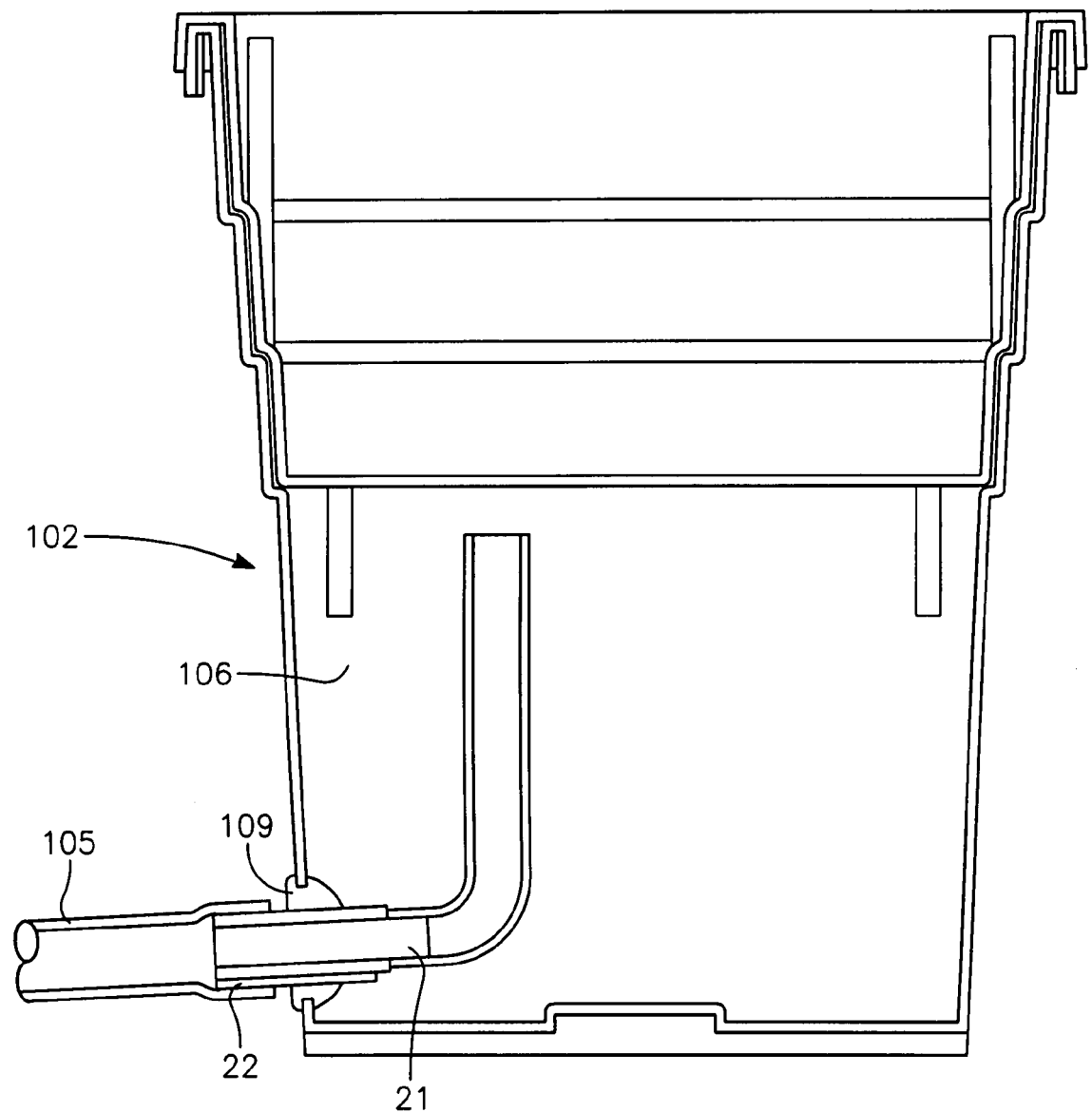
FIG. 12 shows a side elevation view in cross-section of the non-controller reservoirs shown in FIGS. 9 and 10.

FIGS. 11 and 12 show a top plan view in cross-section, and a side elevation view, also in cross-section, of the inside of reservoir 102. Extending into inner space 106 is split tee device 10 which is fitted into grommet 109 at an opening into space 106 through the sidewall of reservoir 102. Liquid nutrients pass through line 105 into passage 22 of the split tee device 10, and begin to fill the inner space 106 of reservoir 102. Once the nutrient level rises to a level equal to the top of the upright tube, the nutrients spill over into the upright tube and exit the reservoir through passage 21 in the split tee device 10.

Figure 13:
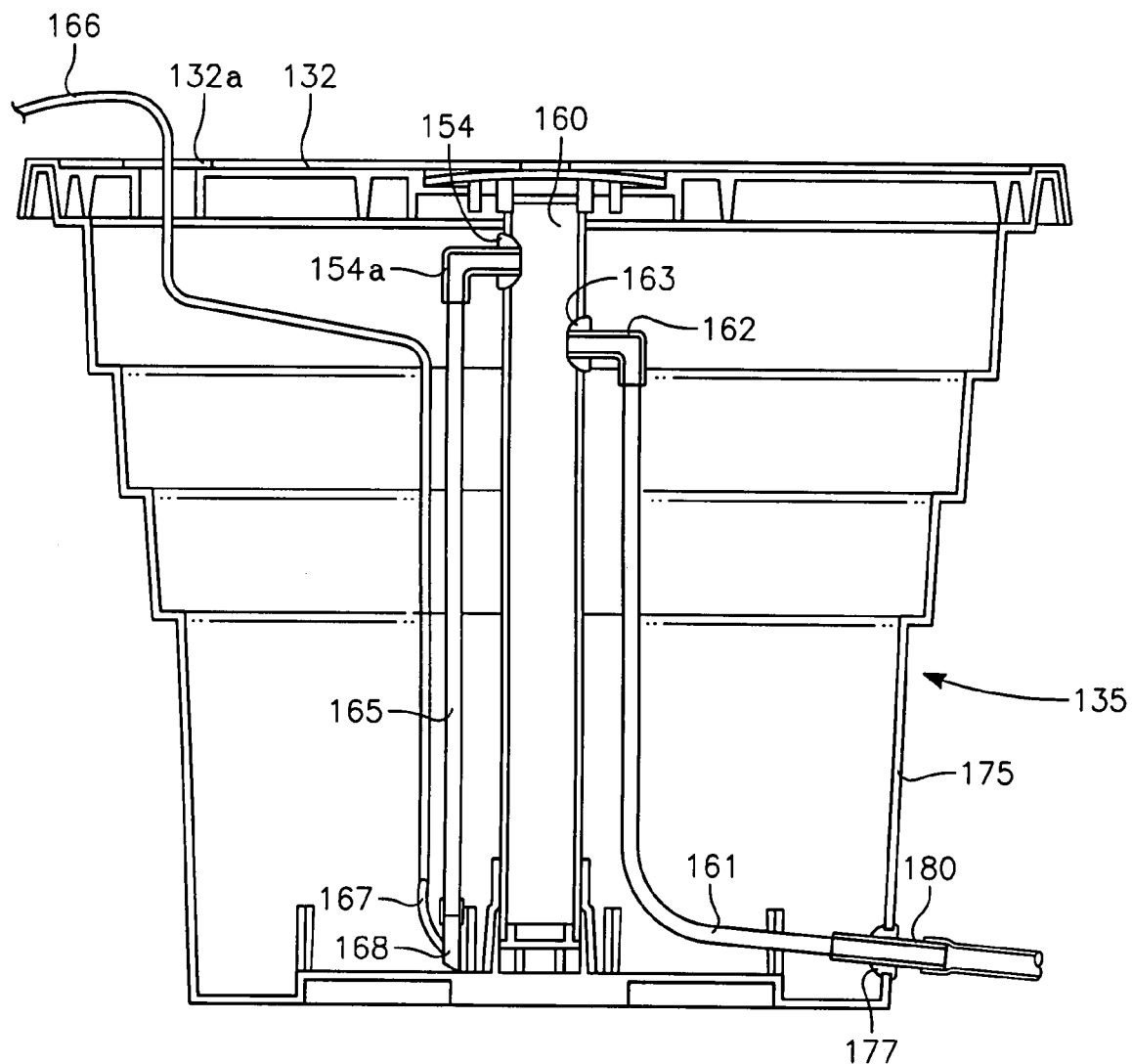
FIG. 13 shows a side elevation view in cross-section of the controller reservoir shown in FIGS. 9 and 10.

FIG. 13 shows reservoir 135 with center column 160 vertically disposed near the center of the internal space inside reservoir 135. Liquids are added to the space inside reservoir 135 until the liquid level is somewhere below the top of center column 160. Air is delivered from an air pump, through narrow diameter tubing 166, which passes through an opening 132a in reservoir closure 132, through connector fitting 168, and up into a larger diameter riser tube 165. Connector fitting 168 includes an arm 167 which is integrally formed with connector 168, and is disposed at an acute angle with respect to the vertical axis of connector 168. The bottom open end of connector 168 is formed at an angle to prevent an inadvertent seal between the bottom of connector 168 and the bottom of reservoir 135. Riser tube 165 fits onto input fitting 154a which is sealed between the fitting 154a and center column 160 with a removable, insertable grommet 154. The air from the air pump pushes liquids through the fittings and tubings into riser tube 165. Positioned somewhere below input fitting 154a is an output fitting 162 which is sealed between the output fitting 162 and center column 160 with a removable, insertable grommet 163. Output hose 161 is connected to output fitting 162 and at the other end is connected to a barbed fitting 180. Barbed fitting 180 passed thru a passage in the side wall 175 of reservoir 135. Grommet 177 provides a seal between barbed fitting 180 and side wall 175 of reservoir 135.

What is claimed is:

1. A hydroponic reservoir system that includes at least one controller reservoir, and at least one other non-controller reservoir that includes a split tee device inserted through the sidewall of said non-controller reservoir, said non-controller reservoir being connected to said controller reservoir by a line through which liquid nutrients pass from said controller reservoir to said non-controller reservoir and back to said controller reservoir, said split tee device including a shank portion and a crossbar portion that includes two hollow passages that are isolated from one another, said shank portion including a hollow, generally cylindrical passage that communicates with one of said crossbar passages, and a crescent-shaped passage that lies alongside said generally cylindrical passage and that communicates with the other crossbar passage.

2. The hydroponic reservoir system of claim 1 wherein each of said non-controller reservoirs includes an internal, upright tube with its inlet connected to said split tee device through said crescent-shaped passage, and wherein each non-controller reservoir lies in substantially the same plane as, or in a lower plane than, said controller reservoir, and wherein the top of said internal, upright tube in the non-controller reservoir from which liquids return directly to said controller reservoir lies substantially at or above the liquid level in said controller reservoir.

3. The hydroponic reservoir system of claim 1 wherein, in said controller reservoir, the connector between the tubes of larger and smaller diameter is a cap for the tube of larger diameter, said cap including an opening on its sidewall connected, at an acute angle, to the wall of said cap, a tube for delivery of air from the tube of smaller diameter to the tube of larger diameter.

4. The hydroponic reservoir system of claim 1 further comprising a column for connection to the internal, bottom surface of said reservoir, said column comprising a hollow tube closed at the bottom and open at the top, and including at least one opening for liquids to flow out of said column, and at least one opening for liquids to flow into said column, said liquids opening receiving tubing that includes a tube of larger diameter connected to a tube of smaller diameter.

5. The hydroponic reservoir system of claim 1 wherein said controller reservoir further comprises said split tee device.

* * * * *